United States Patent [19]
Williams et al.

[11] Patent Number: 5,969,345
[45] Date of Patent: Oct. 19, 1999

[54] MICROMACHINED PROBES FOR NANOMETER SCALE MEASUREMENTS AND METHODS OF MAKING SUCH PROBES

[75] Inventors: Clayton C Williams, Salt Lake City, Utah; Robert C Davis, Ithaca, N.Y.; Pavel Neuzil, Palo Alto, Calif.

[73] Assignee: University of Utah Research Foundation, Salt Lake City, Utah

[21] Appl. No.: 08/847,166

[22] Filed: Apr. 30, 1997

[51] Int. Cl.[6] ........................................ H01J 37/26
[52] U.S. Cl. ................................ 250/234; 250/306
[58] Field of Search .................... 250/234, 306; 216/2; 430/323; 73/105

[56] References Cited

U.S. PATENT DOCUMENTS

| | | | |
|---|---|---|---|
| 4,968,585 | 11/1990 | Albrecht et al. | 430/320 |
| 5,066,358 | 11/1991 | Quate et al. | 156/647 |
| 5,166,520 | 11/1992 | Prater et al. | 250/306 |
| 5,282,924 | 2/1994 | Bayer et al. | 156/643 |
| 5,354,985 | 10/1994 | Quate | 250/234 |
| 5,546,375 | 8/1996 | Shimada et al. | 369/126 |
| 5,581,083 | 12/1996 | Majumdar et al. | 250/306 |

Primary Examiner—Edward P. Westin
Assistant Examiner—Thanh X. Luu
Attorney, Agent, or Firm—Terry M. Crellin

[57] ABSTRACT

A submicrometer photodiode probe with a sub-50 nanometer tip radius is used for optical surface characterization on a nanometer scale. The nanoprobe detects subwavelength optical intensity variations in the near field of an illuminated surface. The probe comprises a metal-semiconductor Schottky diode that is constructed at the end of a micromachined tip of a semiconductor wafer. A process is disclosed for micromachining the tip of the semiconductor wafer and then of creating a photodiode at the tip, with the photodiode having an optical aperture of a size less than 1000 nanometers.

13 Claims, 11 Drawing Sheets

10μm

MICROMACHINED PROBES FOR NANOMETER SCALE MEASUREMENTS AND METHODS OF MAKING SUCH PROBES

BACKGROUND OF THE INVENTION

1. Field of the Invention

The present invention relates generally to scanning probe microscopy and in particular to micromachined submicrometer photodiodes for nanometer scale, near-field photodetection optical microscopy. The invention further relates to a process of fabricating the photodiodes utilizing a novel method of forming small openings in a deposited layer on the end of the micromachined tips of the photodiodes. In addition, the invention also relates to optical intensity mapping on the nanometer scale using the photodiodes in near-field photodetection optical microscopy.

2. State of the Art

In recent years there has been a multitude of developments in scanning probe microscopy that allow imaging on a nanometer scale, yet chemical and molecular identification with these probes remains a great challenge. Standard optical spectroscopic techniques provide a powerful tool for chemical identification but lack spatial resolution on this scale. Near-field optical microscopy offers the possibility of routinely extending the spatial resolution of optical spectroscopy into the nanometer scale. Near-field scanning optical microscopy is an established technique based on the collection or transmission of light through a subwavelength aperture scanned near a surface. Near-field photodetection optical microscopy utilizes a photodetector of subwavelength dimensions. The localized photodetector probe is brought near an illuminated surface where it can directly absorb optical power. As it is raster scanned across the surface the photocurrent signal is recorded to create a two-dimensional image of the optical intensity distribution. The small detector is necessary to achieve a high spatial resolution.

Line photodetectors and light sources that are small (submicrometer) in two dimensions have previously been constructed.

BRIEF DESCRIPTION OF THE INVENTION

The present invention provides a photodiode probe for near-field photodetection optical microscopy, that is submicrometer in all dimensions. In a preferred embodiment of the invention, the probe, referred to as a nanoprobe, is an Al—Si Schottky photodiode with a sub-50 nm tip radius.

Near-field Photodetection Optical Microscopy is a new approach to optical surface characterization on the nanoscale. A sub-wavelength photodiode probe is raster scanned in the near-field of an illuminated sample surface. The nanoprobe detects sub-wavelength optical intensity variations produced by scatterers on the surface. The optical intensity information is used to form a two dimensional image. The optical interaction of the nanoprobe with an illuminated scatterer is modeled as two interacting dipoles with complex dielectric constants. The spatial contrast is the result of a variation in power absorbed by the nanoprobe as a function of distance from the scatterer. The spectroscopic contrast results from the variation in power absorbed by the nanoprobe as the wavelength of incident light is varied through an absorption resonance of the scatterer. In accordance with the present invention, a submicrometer photodiode for near-field photodetection optical microscopy has been developed having 10 picowave sensitivity.

There are several criteria for optimal near-field photodetection optical microscopy probe performance. First, the photodiode must be constructed on a sharp protruding structure so that it can be used in a scanning probe arrangement. It should be noted that the sharpness of the tip is a determining factor of the probes' ultimate resolution. Next, the leakage current of the diode should be minimized. In the design of the present invention, an Al—Si Schottky contact is utilized for the diode and thereby minimizes the Al contact area. Finally, crystalline silicon has a diffusion length on the order of several hundred micrometers. All of the light that falls within a diffusion length from the Al—Si junction is collected. So, to make a submicrometer photodetector all silicon surrounding the detection area must be optically masked.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
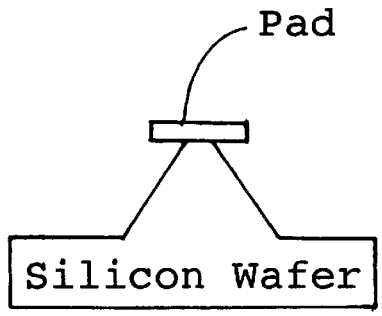
FIG. 1 is a diagrammatic side view of a wafer in the process of forming a sharp tip on the upper surface of the wafer.
Figure 2:
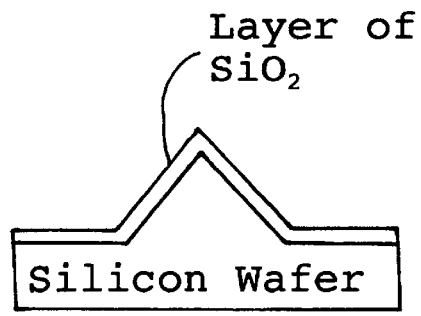
FIG. 2 is a diagrammatic side view of a silicon wafer that has been formed into a sharp tipped probe in accordance with the invention, with the sharp tipped probe having a layer of insulator material thereon.

The nanoprobes are batch fabricated on a silicon wafer. The fabrication of sharp, vertical silicon tips follows processes developed for producing silicon field emission arrays. A sandwich of 100 nm $SiO_2$ and 100 nm $Si_3N_4$ is grown on the Si wafer. A lithography step is performed and the exposed $Si_3N_4$ and $SiO_2$ layers are etched through leaving a 10 µm×10 µm pad of the sandwich layers on the substrate. The pads are in a rectangular array with a spacing of 1 mm×1 mm. The wafer is then placed in a quasi-isotropic silicon etch consisting of nitric acid (70% $HNO_3$) $H_2O$, ammonium fluoride (40% $NH_4F$) and hydrofluoric acid (50% HF) in the following ratios 280:140:6:1 (by volume) $HNO_3$:$H_2O$:$NH_4F$:HF. The silicon is etched until a broad tip is formed. The silicon etch solution etches beneath each of the pads on the silicon wafer to form pyramid-shaped tips as is well known in the art. FIG. 1 shows one tip that is almost completed with the pad positioned at the tip. Etching is conducted until sharp points have been formed at the tips. The silicon is thermally oxidized (100 nm thickness) and the oxide is then removed with buffeted HF(BHF). The resulting structure is again oxidized. This reoxidation process further sharpens the tip. This procedure results in an array of oxidized silicon pyramids 10 µm square on the base and approximately 5 µm high. One of the resulting pyramids is shown in FIG. 2.

Figure 3:
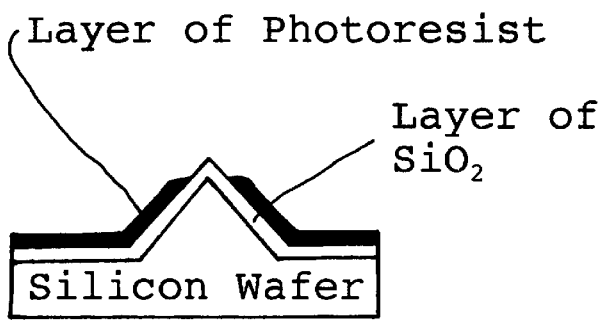
FIG. 3 is a diagrammatic side view of a silicon wafer similar to that of FIG. 2, with a layer of photoresist applied on the layer of insulator material.

The next step is to construct a photodiode near the end of the pyramidal tip. First the oxide is removed from a small region on the tip. When photoresist is spun on the wafer by the conventional method the pyramidal tip is not completely covered. This incomplete coverage by the photoresist is used to advantage. In the method of the present invention, the photoresist step is modified to minimize the opening at the end of the tip. The photoresist (Shipley 1400) is placed on the wafer and spun for only 0.2 second, resulting in a very thick layer of photoresist. The xylene in the photoresist is allowed to evaporate for 5 seconds. The wafer is then spun for 30 seconds at 3000 rpm. This gives the desired result, i.e., only the end of the tip protrudes through the photoresist as shown in FIG. 3. If the photoresist is spun on in conventional fashion, i.e., by omitting the intermediate evaporation step, a large nonsymmetrical portion of the tip will not be covered with photoresist.

Figure 4:
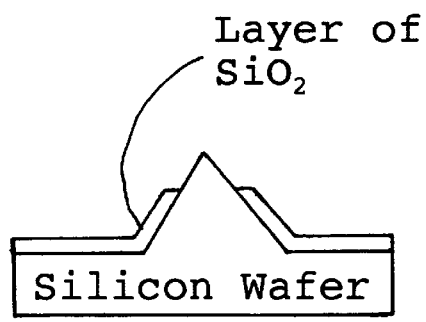
FIG. 4 is a diagrammatic side view of a silicon wafer similar to that of FIG. 2, with an aperture formed in the layer of insulator material.
Figure 5:
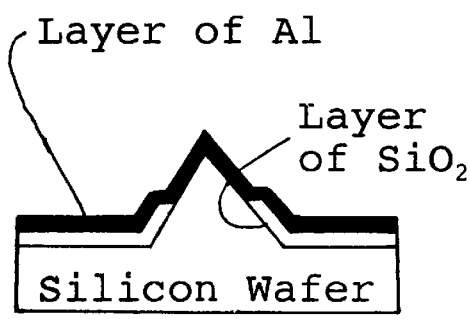
FIG. 5 is a diagrammatic side view of a silicon wafer similar to that of FIG. 4, with a layer of aluminum placed over the layer of insulator material and the tip of the probe that projects through the layer of insulator material.
Figure 6:
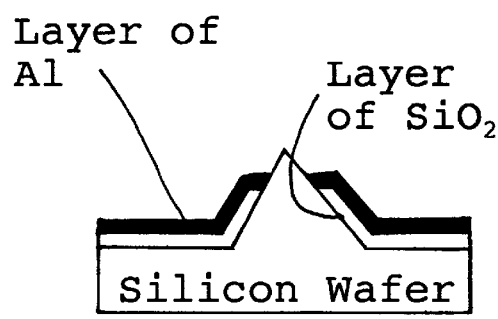
FIG. 6 is a diagrammatic side view of a micromachined diode probe in accordance with the present invention that is achieved by forming a nanometer sized aperture in the layer of aluminum of the wafer of FIG. 5.

Following the application of the photoresist, the oxide is etched from the exposed tip region with BHF and the resist is removed to yield a tip as shown in FIG. 4. The amount of exposed silicon can be controlled by the oxide etch time. Al is then deposited over the entire structure to yield a tip as illustrated in FIG. 5. Photoresist is again applied in the manner described above to cover the surface of the pyramid but have the aluminum at the very tip of the pyramid exposed. The Al in the tip region is then removed with a standard Al enchant solution consisting of 80% phosphoric acid ($H_3PO_4$), 5% nitric acid ($HNO_3$), 5% acetic acid ($CH_3COOH$) and 10% water. The Al etching is done at room temperature to achieve a low etch rate. The photoresist is removed and the Al—Si contacts are sintered at 420° C. for 20 min. The completed photodiode is shown in FIG. 6. An image of the photodiode made by a scanning electron microscope confirms that the photodiode is shaped like a pyramid and has the cross-sectional structure as shown in FIG. 6. The opening in the aluminum is 0.7 µm×0.7 µm and the tip radius is less than 50 nm. These are typical dimensions for the opening size which ranges between 0.5 µm and 1.0 µm. In some cases the tip radius may be considerably smaller than 50 nm. Note that the near-field photodetection optical microscopy probe requirements have been met, i.e., an ultrasharp tip (nanometer radius), a small Schottky contact area, and a very small (submicrometer) optically sensitive region. The silicon surrounding the junction has been optically masked by the Al layer.

Several measurements have been made to characterize the diode both electrically and optically. I-V, photo-I-V, and noise measurements were performed to characterize the sensitivity of the diode.

Figure 7:
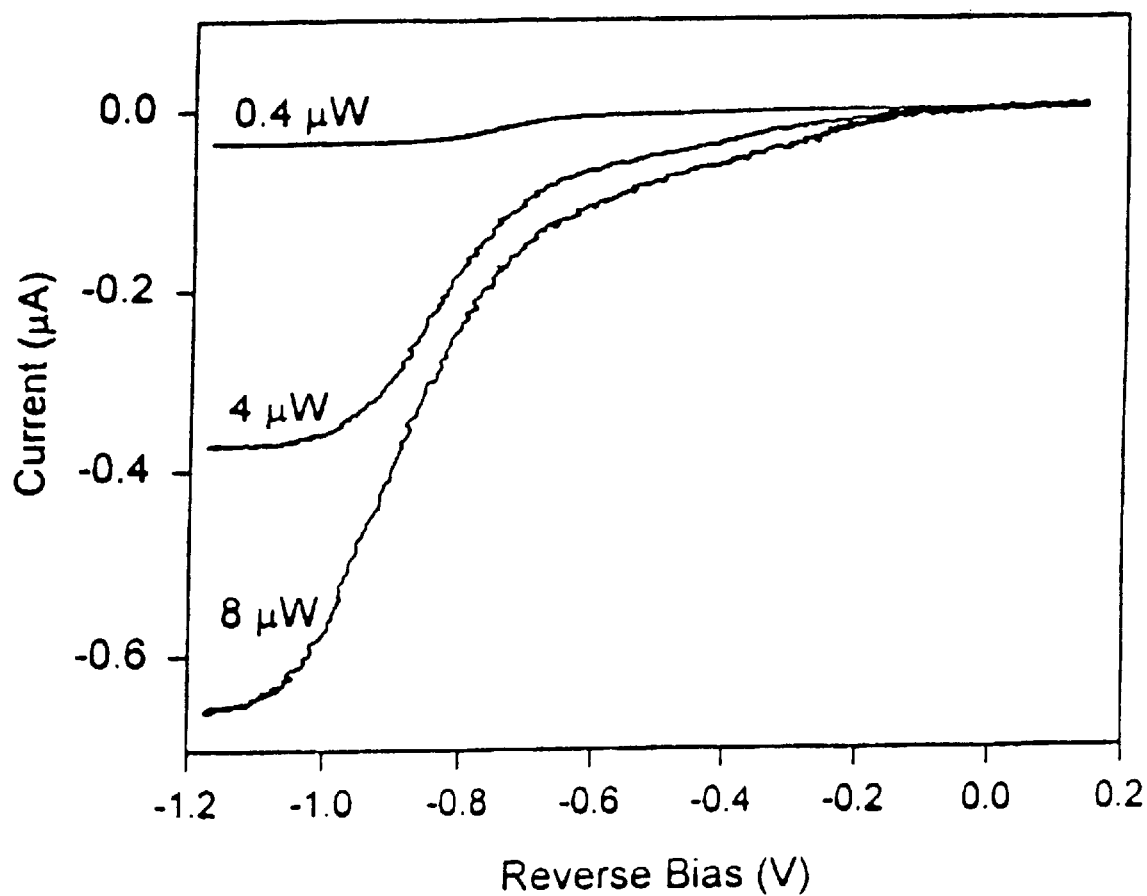
FIG. 7 is a graph of photo-I-V measurements with various illumination intensities for a photodiode probe of the present invention.

Photo-I-V measurements with various illumination intensities were recorded. The reverse bias I-V curves for three different illumination intensities are shown in FIG. 7. Note the strange shape of the photo-I-V curve in reverse bias. With a standard photodiode the reverse bias photocurrent is independent of the applied voltage, whereas the reverse bias photocurrent of the nanoprobe is strongly bias dependent. It is largest with a reverse bias of −1.0 V or greater. At these reverse bias voltages, the photocurrent depends linearly on optical power, as is shown by the three curves in FIG. 7. The optical power levels indicated in FIG. 7 correspond to a HeNe laser beam focused through a microscope objective, with a focal spot size of approximately 3 µm.

To assure that the nanoprobe detector has the same spectral response as a conventional Si photodiode, it was compared with a commercial Si photodetector (Spectra Physics 404 Power Meter). The two detectors show a similar spectral response.

The signal and noise were measured with the diode at a −1.0 V reverse bias. The measurement frequency was 10 KHz. The laser beam was focused to an estimated 1.6 µm spot. With a 50 nW illumination the photocurrent was 6 nA and the noise was 30 fA/√Hz. This corresponds to a conversion efficiency of 0.2 A/W. The signal-to-noise ratio was measured to be $2 \times 10^5$ in a 1 Hz bandwidth. From Scanning Electron Microscope images, it was found that the size of the light sensitive area on this particular photodetector to be near 1 µm². Thus the power falling on the active detector region is 0.37 of the total incident power (50 nW). This indicates that the minimum detectible optical power (S/N=1) is approximately 150 fW. This sensitivity is compatible with a 50 nm×50 nm spatial resolution at this illumination intensity (5 W/cm²).

Figure 8:
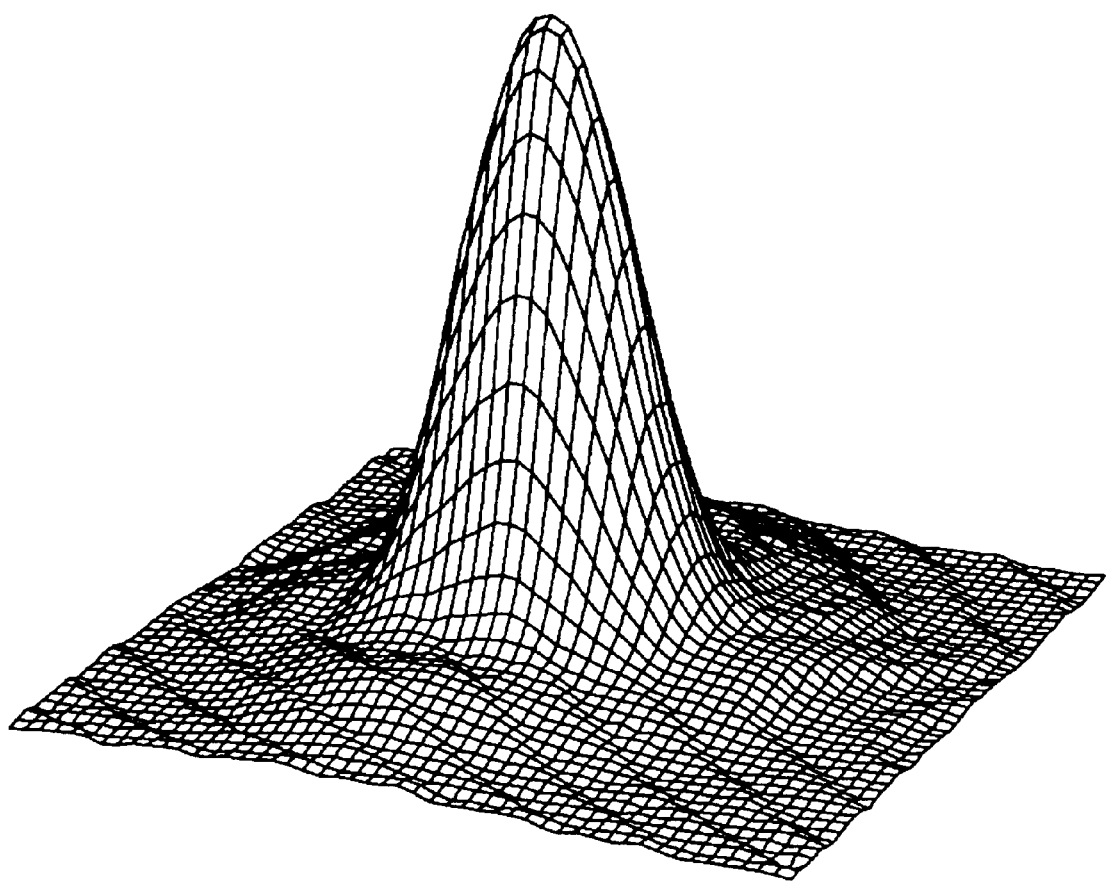
FIG. 8 is an image of a HeNe laser beam profile as determined with a photodiode probe of the present invention.

A focused laser beam profile has been imaged by placing the nanoprobe on a piezoelectric tube and scanning it across the focused beam while measuring its photoresponse. An image of the HeNe laser beam profile is shown in FIG. 8. The resulting image of the optical intensity in the focal plane demonstrates that the nanoprobe is sensitive only in a region at the top of the pyramid. The FWHM focused spot size, in this case, is about 2 µm. With further improvements, the nanoprobe could be employed as an optical beam profile for tightly focused beams.

The process as described above could also be used to create other types of probes. Since a hole of arbitrary size may be made in any layer by simply varying the etch time, a variety of structures can be fabricated. The probe of the present invention could be used as an optical beam profiler for tightly focused laser beams. The probe is also sensitive to temperature and can be used as an effective tool for high resolution thermal microscopy.

By use of a lift off process the inverse of the sharp tipped probe could also be realized, i.e., a small dot of material could be fabricated on the end of the tip. The process could also be used to create a thermal probe by using it to fabricate either a thermistor or a thermocouple. To do this, a sequence of deposition steps and etching steps would be necessary. The etching steps being done through the photoresist hole.

The process has been described above as relating to forming a sharp tipped probe on a silicon wafer. It should be realized that the wafer could be formed in the shape of the cantilever which is to be used with an atomic force microscope. The sharp tipped probe is then fabricated on the end of the cantilever so that the sharp tipped probe is formed integrally on the cantilever that is to be used in the atomic force microscope.

In summary, a submicrometer photodiode has been realized. It has been fabricated by a process that can be scaled for mass production. The nanoprobe appears to meet the requirements for near-field photodetection optical microscopy; it has a submicrometer optically sensitive region with an ultrasharp tip. The diode has a maximum optical sensitivity at a reverse bias of −1.0 V where it can detect optical variations as small as 150 fW. It has a spectral response similar to bulk silicon detectors.

Optical Intensity Mapping on a Nanometer Scale

Near-field photodetection optical microscopy, is a fundamentally new approach to near-field optical microscopy. This scanning probe technique uses a nanometer scale photodiode detector as a near-field optical probe. As stated previously, novel probes have been fabricated for near-field photodetection optical microscopy that have an optically sensitive area as small as 100 nm×100 nm. These new near-field photodetection optical microscopy probes have been employed to image light transmitted through holes in an aluminum film. Near-surface optical interference is observed near defects and edges of the aluminum film. The optical edge response is shown to be on the order of 100 nm. Optical measurements with nanometer scale resolution are now possible using optical scanning probe microscopy techniques. Near-field photodetection optical microscopy is a new, fundamentally different, approach to near-field optical microscopy that utilizes a photodetector of sub-wavelength dimensions. In standard near-field scanning optical microscopy light is scattered through an aperture and collected with a detector in the far-field. In contrast Near-field photodetection optical microscopy utilizes a localized scanning photodetector probe which is brought into the optical near-field of an illuminated surface where it can directly absorb optical power. As it is raster scanned across the surface, the photocurrent signal is recorded to create a two dimensional image of the optical intensity distribution. A small detector is necessary to achieve high spatial resolution. The probes as described hereinbefore have an optically sensitive area as small as 100 nm×100 nm. This allows two dimensional near-field imaging with a sub-wavelength photodetector probe (100 nm×100 nm) having spatial resolution on the 100 nm scale. Near-surface optical interference can also be observed near defects and edges of an aluminum film.

The basic fabrication process for the silicon photodiode probes is described in detail above. FIG. 6 shows a cut-away schematic of the probe structure. This illustration shows a micromachined silicon pyramid with 100 nm $SiO_2$ covering all but the last two micrometers of the tip. This structure is covered with an 80 nm aluminum film with a small opening (100–200 nm) in the film at the end of the tip. The opening in the aluminum at the end o the tip is approximately 200 nm×200 nm. Probes can be routinely fabricated with aperture sizes ranging from 200 nm to below 100 nm. This is a factor of five times smaller than for probes previously produced. Note that the creation of this small opening is achieved in a batch fabrication process without the use of lithography. By these methods, an ultra-sharp tip, a small Schottky contact area, and a very small optically sensitive region have been realized. The aluminum contact near the tip end creates a built-in field that rapidly collects the photogenerated carriers. The aluminum also acts as an aperture which currently defines the spatial resolution of the probe.

The carriers generated in the bare silicon region of the tip may not be collected, making this region optically insensitive. To improve the collection of carriers from this region, a metal layer is preferably deposited so as to cover the bare silicon area. This must be a thin transparent metal layer to allow light penetration. This deposition step can be performed following the fabrication of the probe as described hereinbefore. Alternatively, the bare silicon area can be covered with metal by a procedure that is a modification of the basic process described above. The metal etching step that forms the aperture can be modified resulting in a thin layer of aluminum covering the tip. In the modified process the aluminum etching time is reduced and the aluminum is not etched completely through, but only thinned. This modified process has the added benefit of further reducing the effective size of the collection area as the aluminum will be thinnest over the end of the tip.

Figure 9:
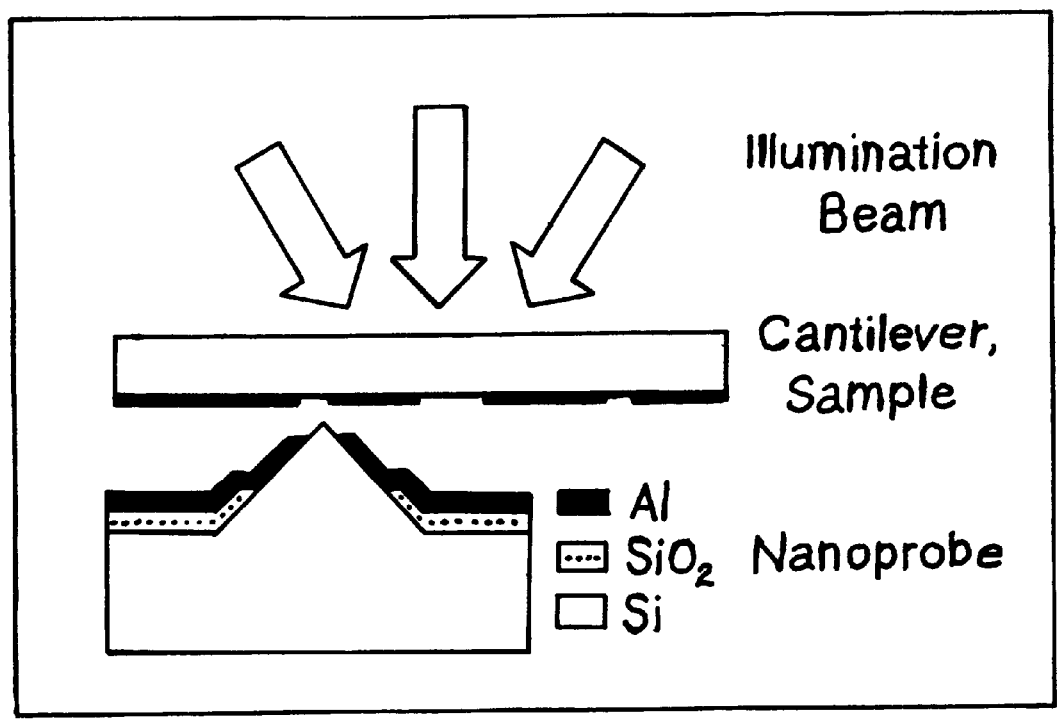
FIG. 9 is a diagrammatic representation of a system for using the photodiode probe of the present invention for high resolution intensity mapping of a surface of a sample.

The near-field photodetection optical microscopy probe has been employed in high resolution intensity mapping. The imaging system is illustrated in FIG. 9. The nanoprobe is mounted on a piezoelectric scanning tube. The sample is located on a cantilever allowing use of non-contact AFL for height control. Nanometer scale structure on the sample is created as follows. A 40 nm aluminum film is deposited on a glass cantilever containing a sparse layer of latex spheres. The latex particles are removed after the aluminum deposition by immersion in an ultrasonic cleaner followed by gentle wiping with an alcohol wetted tissue. This results in holes in the aluminum film of the size of the latex particles. A HeNe laser beam, focused midway down the length of cantilever, is used for the non-contact AFL force detection. It has been verified that the AFL laser light is not detected by the near-field photodetection optical microscopy probe. The sample is illuminated with a second HeNe laser beam focused on the back of the film directly over the near-field photodetection optical microscopy probe. The illumination intensity of this beam at the sample surface is 10 W/cm$^2$.

Two samples have been imaged, the first with 800 nm latex holes and the second with 200 nm holes. The cantilever is driven near resonance at an amplitude of 20 nm. The photodiode probe is raster scanned while the AFL feedback loop keeps it at a constant average distance from the sample surface. The 20 nm cantilever dither produces a small AC modulation of the near-field photodetection optical microscopy signal. The AC signal can be detected by a lock-in amplifier, or the DC component can be measured directly. Simultaneous optical and topographic images are taken.

Figure 10:
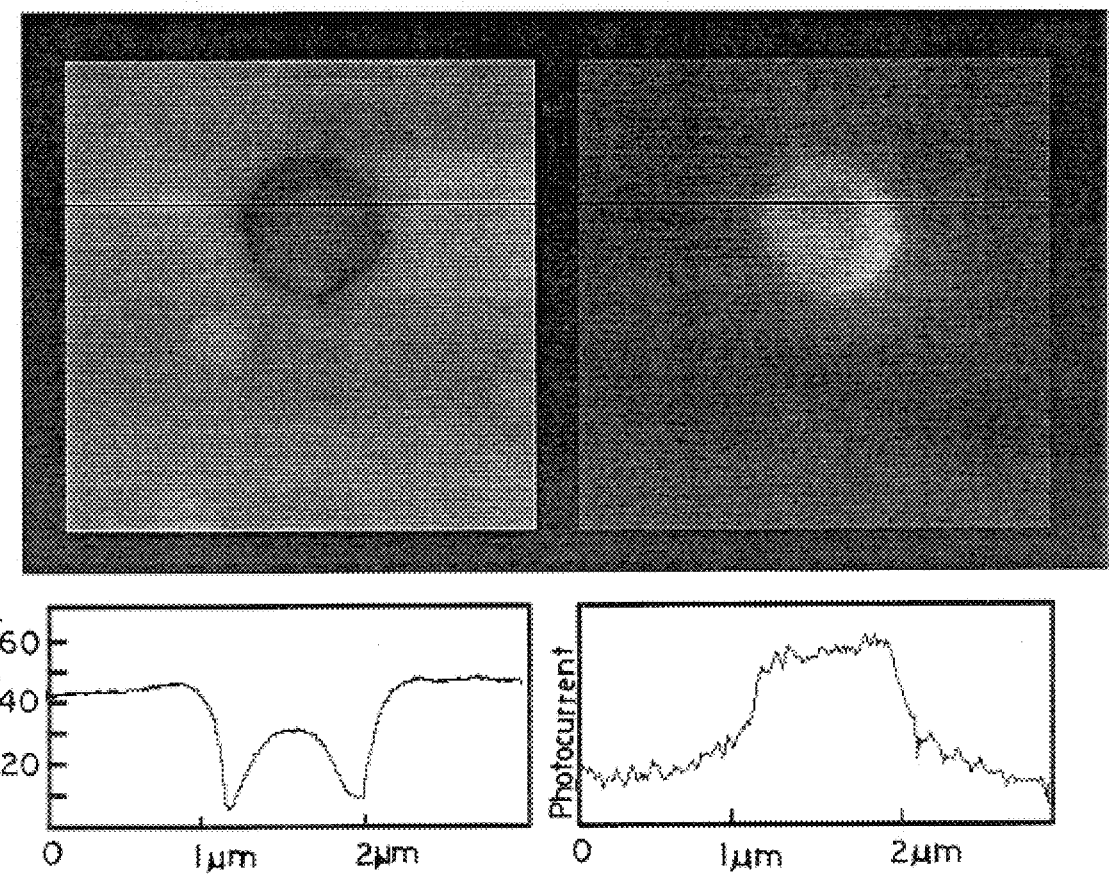
FIGS. 10–12 show images of 200 to 800 nanometer holes in 40 nanometer thick aluminum film as determined with a system as shown in FIG. 9.

Images of an 800 nm hole in a 40 nm thick aluminum film are shown in FIG. 10. The left image is a non-contact AFL topographic image. The image on the right displays the nanoprobe photocurrent detected by the lock-in amplifier at the dither frequency. Below each image are corresponding linescans cut through the middle of the hole. Since the probe is following the contour of the surface, it is essential to verify that the optical and topographic information are independent. This is done by examining the linescans. The AFL image shows that there is a hemispherical bump nearly filling the bottom of the hole in the aluminum film (most likely contamination). This feature was not seen in any of the other samples. While the topographic image shows the bump inside the hole, the optical image is approximately uniform across the bottom of the hole. This data demonstrates that the Near-field photodetection optical microscopy probe is not just mapping topography. Also visible in the optical line scan is the sharp transition to larger optical signal as the probe enters the hole. This transition length is approximately 100 nm.

Figure 11:
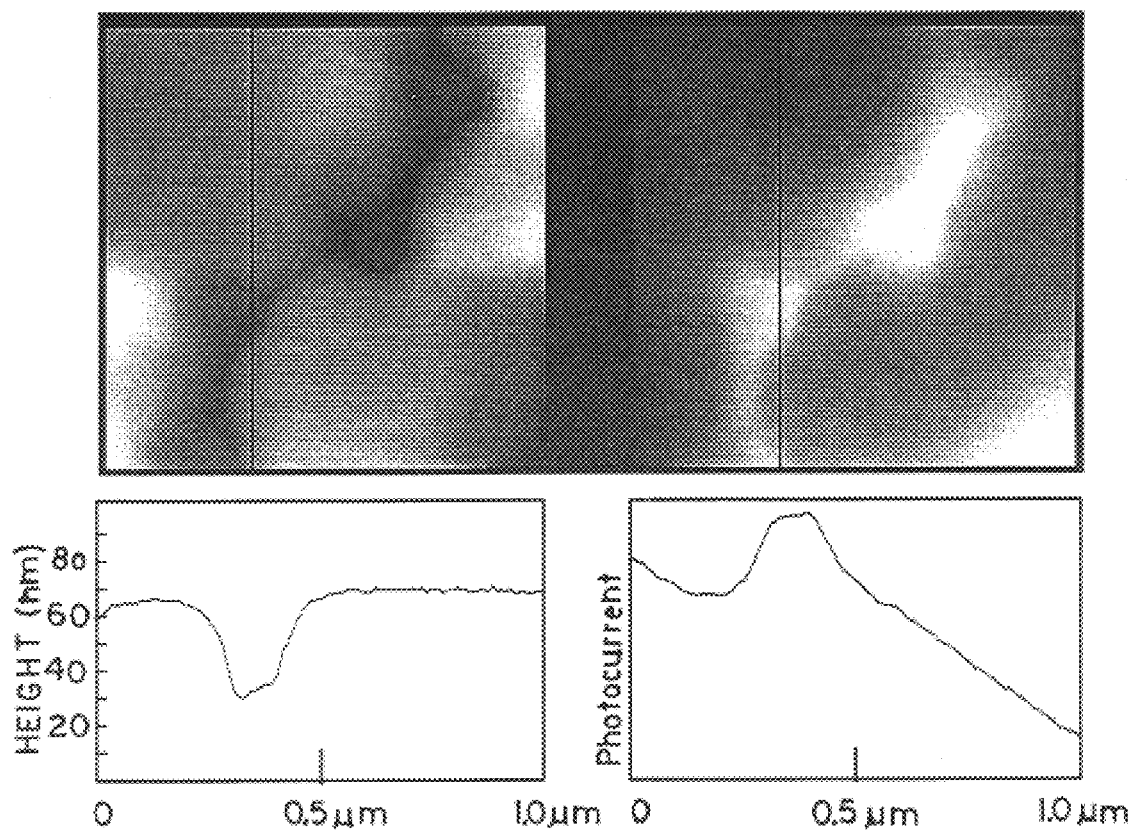

Images containing several 200 nm holes are shown in FIG. 11. The left image is a topographic image, while the right image is a DC optical image. Below each image is a vertical line cut as indicated in the image. The transition length of the optical signal at the hole edges is approximately 100 nm.

Figure 12:
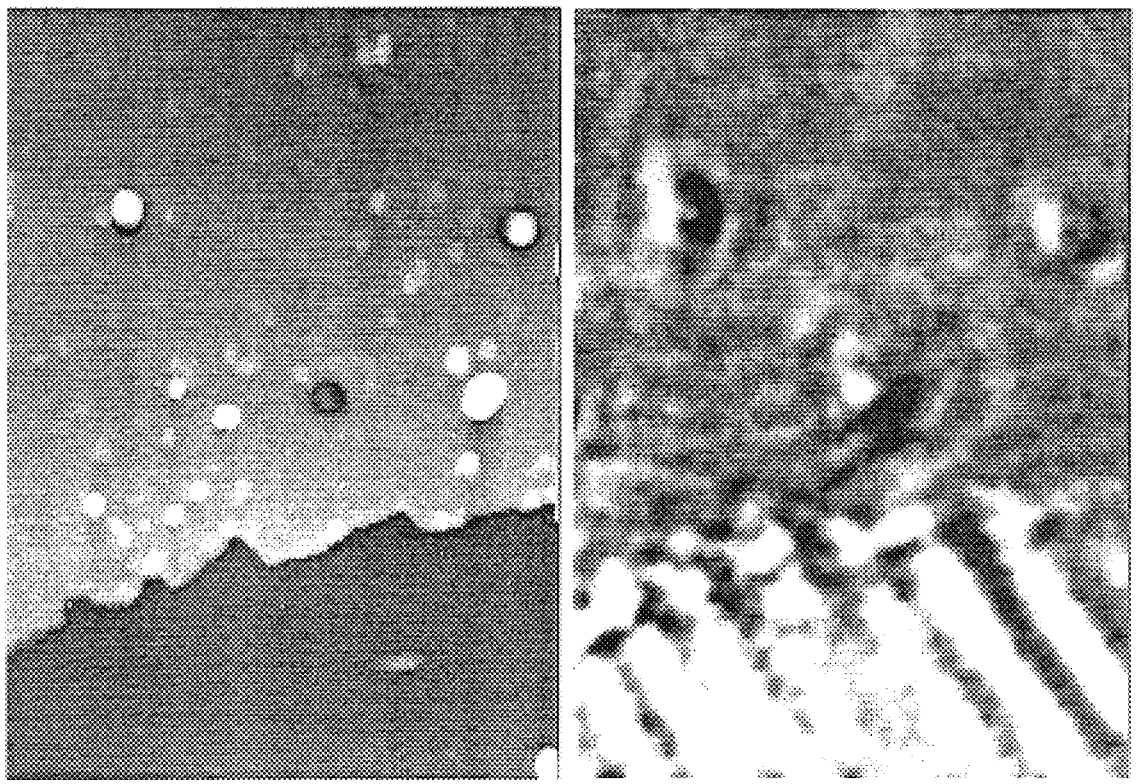

The optical image also indicates that the optical intensity outside of the hole is not zero, but drops off over hundred of nanometers. Scanning electron microscope images of the detector tip indicate this slow drop off is not due to poor resolution of the detector. This non-zero optical signal outside of the holes is readily seen by looking at the AC component of the optical signal. The vertical dither tends to accentuate variations of intensity on the slowly varying background. FIG. 12 is an 11×15 m image near an edge of the aluminum film. The film contains several 800 nm holes and some latex particles which were not removed by the cleaning. The region on the bottom of the image, below the aluminum edge, is transparent glass. The left image is topography and the image on the right is the AC optical signal at the dither frequency. This signal correspond to the vertical derivative of the optical intensity. Interference patterns in the electric field are seen parallel to the aluminum edge up to a distance of four micrometers from the edge. Interference patterns are also seen radially surrounding the holes in the film to a distance of about one micrometer. These are believed to be due to light waves scattered across the metal surface from the aluminum edges. The spatial variations in the optical intensity in the glass region correspond to interference effects in the illumination beam.

The nanoprobe is also sensitive to temperature and may be an effective tool for high resolution thermal microscopy. In principle, direct optical heating of the aluminum films could provide a thermal contribution to the nanoprobe signal. Our data indicates, however, that any thermal contribution to the signal is small compared to the optical contribution. This can be readily seen in FIG. 11. If the thermal contribution were dominant, the nanoprobe signal would be smaller rather than larger over the holes in the aluminum. The previously published spectral response of an illuminated nanoprobe also shows that its signal is dominated by the optical response of silicon.

A new near-field photodetection optical microscopy technique with edge response on the order of 100 nm is disclosed. Photodiode probes with 100 nm×100 nm optically sensitive areas have been constructed for Near-field photodetection optical microscopy using batch fabrication methods. Simultaneous non-contact AFL topographic and near-field optical images of 800 nm and 200 nm holes in aluminum films have been performed with the probes. The nanoprobes have been used to measure small differential changes in the optical intensity near a conducting surface showing interference patterns created by the surface boundaries. The photodiodes have a 150 fW√Hz detection sensitivity. With this detection sensitivity the probes may be useful for performing optical spectroscopy for chemical identification.

Nanometer Scale Absorption Spectroscopy

As stated previously, near-field photodetection optical microscopy is a fundamentally new approach to near-field optical microscopy. This scanning probe technique uses a nanometer scale photodiode detector which absorbs optical power directly as it is scanned in the near-field of an illuminated sample surface. We have applied near-field photodetection optical microscopy to measure the visible absorption spectrum of dye molecules embedded in a single 300 nm polystyrene sphere. The near-field absorption spectrum is obtained by measuring the near-field photodetection optical microscopy probe photocurrent while the wavelength of the illumination pump beam is scanned from 400 nm to 800 nm. Peaks are identified at 567 nm, 608 nm and 657 nm in the near-field spectrum of the single dyed polystyrene sphere. These peak positions are in good agreement with far-field absorption measurements performed on many dyed polystyrene spheres.

Chemical and molecular identification on a nanometer scale has many important applications. Examples include the identification of biological structures such as proteins in heterogeneous environments. The ability to perform such measurements under liquid would aid in the understanding of bimolecular interactions at surfaces. In the semiconductor industry, the identification of small amounts of contamination on wafers could lead to improvements in processing yield. The capability for generic molecular identification on the nanometer scale is largely unachieved —either directly or through the use of fluorescent labels. However, due to the diffraction limitation, conventional far-field optical techniques do not extend far into the nanometer scale. Near-field optical microscopy offers the possibility of combining the power of optical spectroscopy with nanometer scale spatial resolution.

Near-field scanning optical microscopy is a technique based on the collection or transmission of light through a sub-wavelength aperture scanned near a surface. Near-field scanning optical microscopy is capable of imaging the optical intensity distribution on a surface with resolution below 50 nm, far below the diffraction limit. Nanometer scale optical microscopy has also been performed without an aperture using an interferometric technique based on scattering from an atomic force microscope tip near the sample. In another measurement requiring a conducting surface, an scanning tunneling microscope tip has been used to perform nanometer scale absorption microscopy and spectroscopy.

Near-field photodetection optical microscopy is a new, fundamentally different, approach to near-field optical microscopy and spectroscopy. It utilizes a photodetector of sub-wavelength dimensions. The localized photodetector probe is brought into the optical near-field of an illuminated surface (conducting or non conducting) where it can directly absorb optical power. As the photodetector is raster scanned across the surface, the photocurrent signal is recorded to create a two dimensional image of the optical intensity distribution. Near-field photodetection optical microscopy photodetectors with sub-wavelength tip radii, but with total photosensitive areas of many square micrometers, have been used to measure evanescent fields at surfaces. As reported above, near-field photodetection optical microscopy imaging has been demonstrated with a probe having a true sub wavelength optically sensitive area of 100 nm×100 nm. It is shown clearly that the optical near-field photodetection optical microscopy image is not directly correlated with surface topography.

In accordance with the present invention, the near-field photodetection optical microscopy probe is utilized for the first time to perform nanometer scale molecular characterization. Spectroscopic characterization of dyed polystyrene spheres on a transparent, insulating surface (glass) is accomplished by near-field absorption spectroscopy (FIG. 13(a)). The dyed spheres are illuminated through the glass. The near-field photodetection optical microscopy photodiode probe is brought into the optical near-field of a single, dyed polystyrene sphere on the cantilever surface where it detects the modification of the illumination fields due to the presence of the sphere. The illumination beam is scanned in wavelength and near-field photodetection optical microscopy probe photocurrent is used to record the spectroscopic response of the particle.

Figure 13:
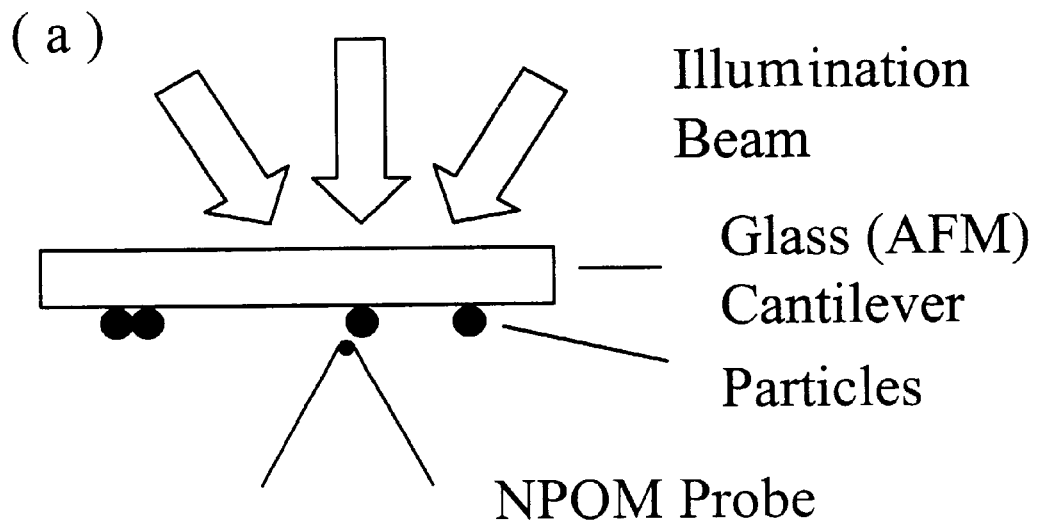
FIG. 13 shows diagrammatically a system for using a near-field photodetection optical microscopy probe of the present invention to perform nanometer scale molecular characterization.
Figure 13:
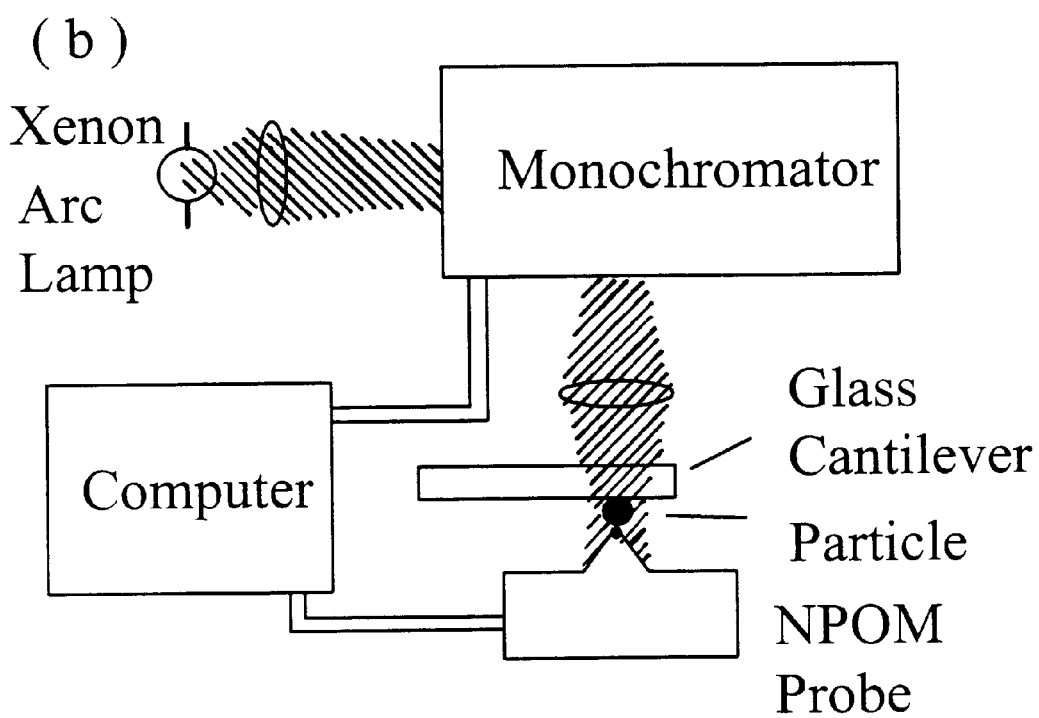

The experimental setup is illustrated in FIG. 13. A non-contact AFL technique is used to control the height of the probe above the sample surface. While in conventional AFL the probe tip is mounted on a cantilever, in our current experiment, the sample is placed on a glass AFL cantilever. The sample consists of dye molecules embedded in 300 nm polystyrene spheres. These are "blue dyed latex spheres, Mfg. Lot #3132, obtained from Seradyne, Inc. Seradyne will not provide the chemical identity of the dye molecule as the dye is proprietary. The spheres are dispersed on the surface of the 1 mm×100 μm×20 μm glass cantilever. The near-field photodetection optical microscopy probe is mounted on a piezoelectric scanning tube. The illumination source consists of a 75 W xenon arc lamp source and a 0.32 meter scanning monochrometer. The monochrometer is used to pass a narrow band of wavelengths from the broadband arc lamp illumination source. This light is focused through the glass cantilever to a 50 μm spot on the AFL cantilever surface. This illuminates the dyed spheres, dispersed on the cantilever surface. A computer is used to scan the monochrometer wavelength and record the photocurrent of the near-field photodetection optical microscopy probe.

Far-field absorption spectra of the dyed polystyrene spheres were obtained for comparison with near-field results. A monolayer of dyed spheres is distributed on a glass microscope cover slip. The absorption spectrum of the monolayer was obtained with a commercial spectrophotometer (Variant model D). The absorption spectrum is shown in FIG. 14, curve(a).

Far-field absorption spectroscopy was again performed on the monolayer of dyed spheres with the near-field photodetection optical microscopy experimental setup described above by placing the monolayer in the beam path before the beam is focused onto the near-field photodetection optical microscopy detector. Spectra were taken with and without the monolayer in the beam path to separate the response of the particle from the optical system response. Without the monolayer in the beam path, the wavelength was scanned from 400 nm to 800 nm and the photocurrent is recorded (FIG. 14, curve(b)). The dominant feature of this measurement of optical system response is a broad curve peaking around 600 nm. This broad curve is due to the monochrometer grating response (1800 grooves/mm blazed at 600 nm). The narrow peak at 770 nm and the group of small peaks centered around 450 nm are known peaks in the xenon arc lamp emission. The monolayer is then placed in the beam path (in the far-field) and another spectrum is taken (FIG. 14, curve(c)).

Figure 14:
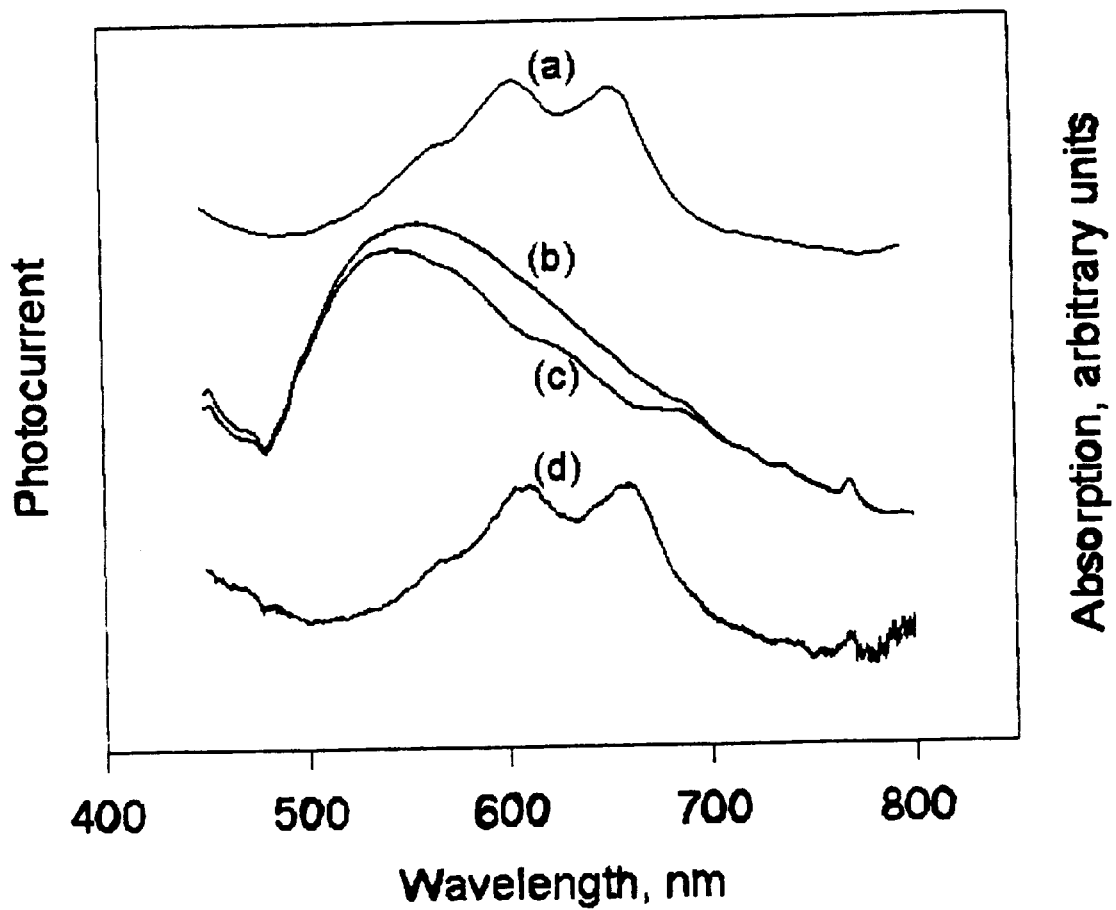
FIG. 14 show far-field adsorption spectra of dyed polystyrene spheres as obtained with a commercial spectrophotometer.

The spectrum taken with the monolayer of dyed particles in the beam path (FIG. 14, curve(c)) is a product of the system response, $I(\lambda)$, and the transmission through the monolayer, $T(\lambda)$. The spectrum obtained without the monolayer in the beam path (FIG. 14, curve(b)) is the system response $I(\lambda)$. The system response consists of the output spectrum of the arc lamp source multiplied by the responses of the monochrometer and the near-field photodetection optical microscopy probe. Dividing curve (c) by curve (b) of FIG. 14 removes the system response yielding the monolayer transmission $T(\lambda)$ $$\frac{\text{curve}(c)}{\text{curve}(b)} = \frac{I(\lambda)T(\lambda)}{I(\lambda)} = T(\lambda)$$

Subtracting this from unity give the absorption, $A(\lambda)$, from the monolayer, displayed in FIG. 14, curve(d). We don't expect any spectral signature from scattering and neglect it in this treatment.

$$\text{curve}(d) = 1 - T(\lambda) = A(\lambda)$$

Peaks are observed at 567 nm, 608 nm and 657 nm. This absorption curve is in excellent agreement with the absorption measurement taken on the dyed spheres with the commercial spectrophotometer (FIG. 14, curve(a)).

Figure 15:
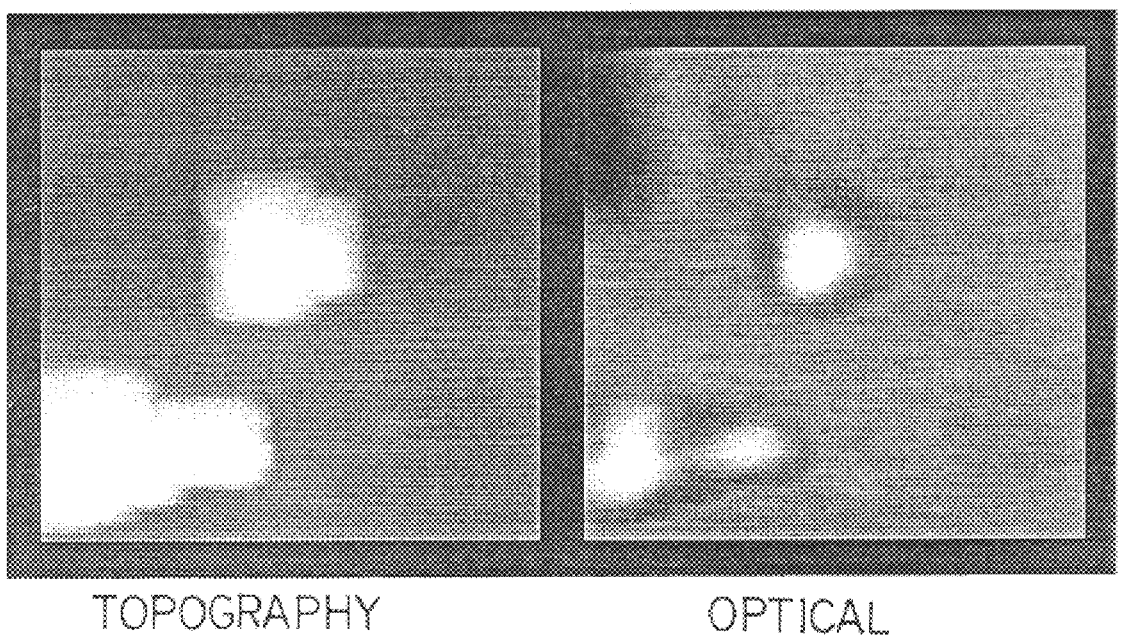
FIG. 15 are images of dyed polystyrene spheres obtained using a near-field photodetection optical microscopy probe of the present invention.

To demonstrate the high spatial resolution of the spectroscopy measurement, the near-field photodetection optical microscopy probe is brought into the near-field of the dyed spheres distributed on the glass AFL cantilever. The spatial distribution of the optical power in the near-field of the spheres is obtained by raster scanning the probe to generate an image (FIG. 15). The image size is 3.5 m×3.5 m. The illumination wavelength is fixed at 550 nm. The image displayed on the left side is a non-contact AFL image, representing topography. The image on the right is near-field photodetection optical microscopy photocurrent. One of the dyed spheres is located near the center of the image. In this region, the optical image shows a bright spot surrounded by a dark ring. When the absorption spectrum is taken in the near-field of the sphere, the probe is centered on the top of the sphere. The non-contact AFL image shows structure containing multiple bumps centered on the sphere. We can attribute this structure to the finite size and shape of the near-field photodetection optical microscopy probe, as the multiple bump shape and orientation are repeated at other places in the AFL image. Another confirmation that we are looking at a single dyed sphere is that the spatial extent of the AFL structure is significantly larger than the width of the structure in the near-field photodetection optical microscopy image. The spatial half-width of this structure in the near-field photodetection optical microscopy image (300 nm) corresponds to the known size of the polystyrene spheres. This image (FIG. 15) is characteristic of the many polystyrene spheres we have imaged.

Figure 16:
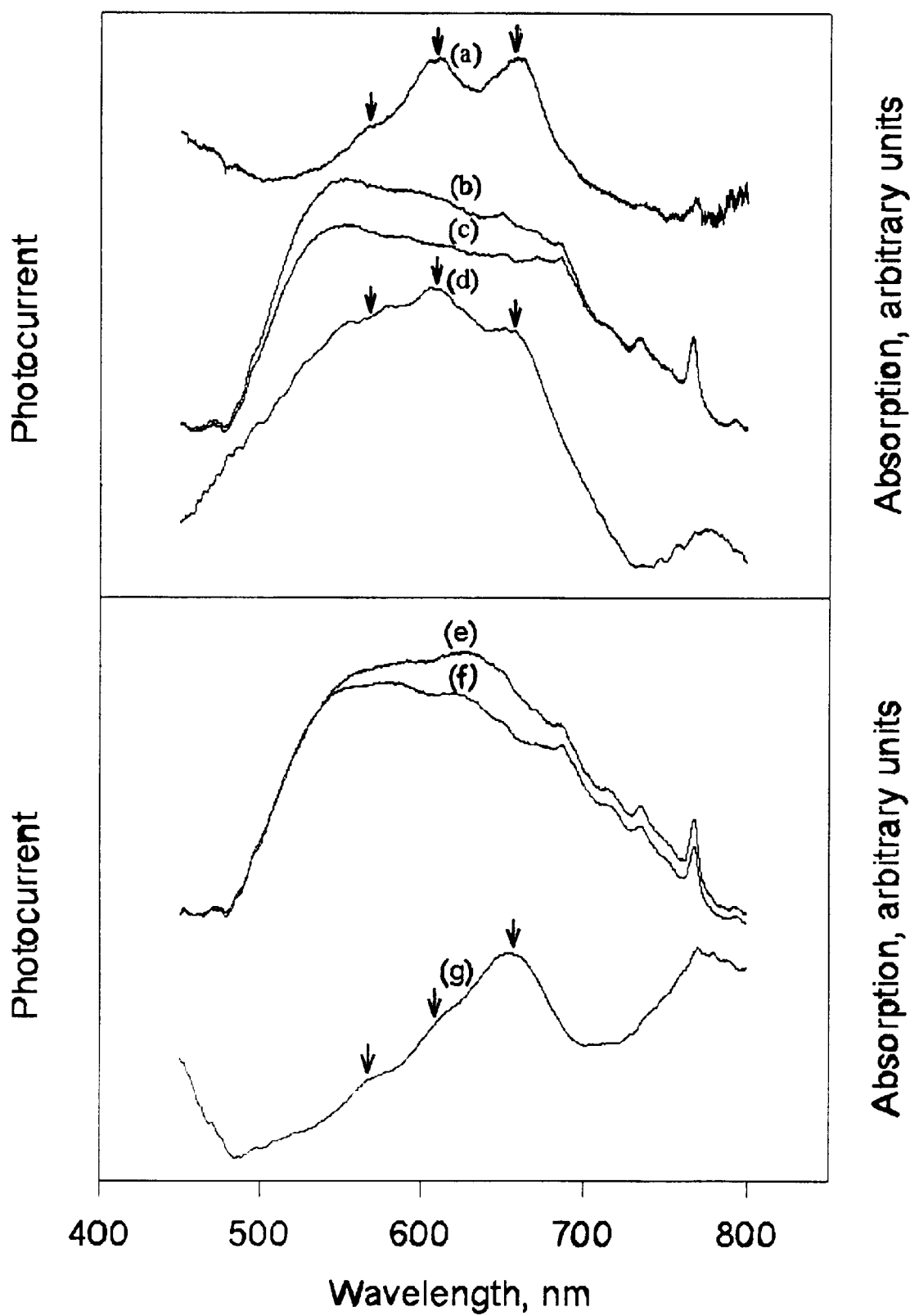
FIG. 16 show near-field adsorption spectra of a dyed polystyrene sphere using a near-field photodetection optical microscopy probe of the present invention.

Near-field spectroscopy is performed with the probe in the near-field of a dyed sphere. As in the far-field measurement, two spectra are taken to separate the spectral response of the dyed sphere from that of the rest of the optical system. To measure the system spectral response, the near-field photodetection optical microscopy probe is moved away from the sphere of interest a distance of two micrometers. The wavelength is scanned from 400 nm to 800 nm and the photocurrent is recorded (FIG. 16, curve(b). The probe is then centered on the top of the sphere and the photocurrent is again recorded as the wavelength is scanned (FIG. 16, curve(c). Curve (c) of FIG. 16 is divided by curve (b) of FIG.

16 and subtracted from unity. The result is scaled and shifted to plot with the other curves in FIG. 16. We call the result the near-field absorption spectrum (FIG. 16, curve(d)). Peaks in the near-field absorption spectrum of this sphere are observed at 610 nm and 660 nm. The positions of these peaks are in good agreement with the far-field measurement. There are however several differences in the curve (d) of FIG. 16 when compared to the far-field spectrum (curve (a) of FIG. 16). The shoulder seen at 570 nm in the far-field is not observed here and the relative amplitudes of the observed peaks differ as well. The differences between near-field and far-field spectra are not understood and require further study.

Not all dyed spheres exhibit exactly the same near-field absorption spectrum. The curves (e), (f) and (g) of FIG. 16 display the spectrum of a particle at a different location on the AFL cantilever surface. Photocurrent curves are obtained with the near-field photodetection optical microscopy probe located two micrometers away from the particle (FIG. 16, curve(f)) and centered above the particle (FIG. 16, curve(e)). Repeating the procedure described above, the system response is removed yielding the near-field absorption spectrum of the dyed sphere (FIG. 16, curve(g)). The peak at 660 nm is clearly visible in the far-field spectrum. The peak at 610 nm is now seen as a shoulder at that wavelength. The shoulder at 570 nm is also observed. The positions of all three peaks are in excellent agreement with the far-field spectrum. The measurement of the spectra on and off this particle was repeated three times to confirm that we were measuring the true spectral response of the particle and not the convolution of its spectral response with some system drift. The repeatability of the measurement was excellent. This particle is exhibiting a clear spectral difference from the first particle (FIG. 16, curves (b), (c) and (d)). Other particles studied, likewise, showed good agreement in peak position. They also exhibited variations in peak amplitude. The source of these differences is unclear. Local optical interference effects may explain the observed peak height modulation.

Note that these measurements were performed with an incoherent source (<1W/cm$^2$). If tunable laser sources are used, spectroscopy of much smaller particles can be performed.

In summary, near-field absorption spectroscopy is performed on dye molecules embedded in a single 300 nm polystyrene sphere using a 100 nm near-field photodetection optical microscopy detector. Positive identification of the dye was made by comparison to far-field absorption measurements on the dye. This is the first absorption spectroscopy performed by near-field photodetection optical microscopy.

Although preferred embodiments of the apparatus and methods of the present invention have been illustrated and described, it is to be understood that the present disclosure is made by way of example and that various other embodiments are possible without departing from the subject matter coming within the scope of the following claims, which subject matter is regarded as the invention.

We claim:

1. A nanometer scale probe for use in scanning probe microscopy, said probe comprising
    a pointed tip made of a semiconductor material, said pointed tip having an apex that has a radius that is no greater than about 50 nanometers;
    a layer of insulator material covering said pointed tip; and
    an opening in said layer of insulator material through which a portion of said pointed tip including said apex projects.

2. A nanometer scale probe in accordance with claim 1 wherein said layer of insulator material has a thickness of up to about 100 nanometers.

3. A nanometer scale probe in accordance with claim 1 further comprising
    a layer of metal covering the layer of insulator material;
    an opening in said layer of metal that coincides with the opening in said layer of insulator material so that said portion of said pointed tip including said apex projects from said opening in said layer of insulator material and said opening in said layer of metal, whereby said portion of said pointed tip that projects from said opening in said layer of insulator material and said opening in said layer of metal makes contact with only the layer of said insulator material.

4. A nanometer scale probe in accordance with claim 3 wherein said layer of insulator material has a thickness of up to about 100 nanometers and said layer of metal has a thickness of up to about 80 nanometers.

5. A nanometer scale probe in accordance with claim 4 wherein the opening in the layer of metal has a size of up to about 1000 nanometers.

6. A nanometer scale probe in accordance with claim 1 further comprising
    a layer of metal that is capable of forming a Schottky contact with said semiconductor material, said layer of metal covers the layer of insulator material and contacts the pointed tip of semiconductor material adjacent to the opening in said layer of insulator material;
    an opening in said layer of metal through which said apex of said pointed tip projects.

7. A nanometer scale probe in accordance with claim 6 wherein said layer of insulator material has a thickness of up to about 100 nanometers and said layer of metal has a thickness of up to about 80 nanometers.

8. A nanometer scale probe in accordance with claim 7 wherein the opening in the layer of metal has a size of up to about 1000 nanometers.

9. A nanometer scale probe in accordance with claim 1 further comprising
    a layer of metal that is capable of forming a Schottky contact with said semiconductor material, said layer of metal covers the layer of insulator material and the pointed tip of semiconductor material.

10. A sharp tipped probe comprising
    a pointed tip made of a material that will allow light to pass therethrough, said pointed tip having an apex that has a radius that is no greater than about 50 nanometers;
    a layer of metal covering said pointed tip;
    an opening in said layer of metal through which a portion of said pointed tip including said apex projects.

11. A sharp tipped probe in accordance with claim 10 wherein said layer of metal has a thickness of up to about 80 nanometers.

12. A sharp tipped probe in accordance with claim 11 wherein the opening in the layer of metal has a size of up to about 1000 nanometers.

13. A nanometer scale probe for use in scanning probe microscopy, said probe comprising
    a pointed tip made of a conductor material, said pointed tip having an apex that has a radius that is no greater than about 50 nanometers;
    a layer of insulator material covering said pointed tip;
    an opening in said layer of insulator material through which a portion of said pointed tip including said apex projects;

a layer of metal covering the layer of insulator material;

an opening in said layer of metal that coincides with the opening in said layer of insulator material so that said portion of said pointed tip including said apex projects from said opening in said layer of insulator material and said opening in said layer of metal, whereby said portion of said pointed tip that projects from said opening in said layer of insulator material and said opening in said layer of metal makes contact with only the layer of said insulator material.

* * * * *

UNITED STATES PATENT AND TRADEMARK OFFICE
CERTIFICATE OF CORRECTION

| | | |
|---|---|---|
| PATENT NO. | : 5,969,345 | Page 1 of 1 |
| APPLICATION NO. | : 08/847166 | |
| DATED | : October 19, 1999 | |
| INVENTOR(S) | : Williams et al. | |

It is certified that error appears in the above-identified patent and that said Letters Patent is hereby corrected as shown below:

In the Specification

Column 1
Line 5, Insert new paragraph with heading --GOVERNMENT LICENSE RIGHTS
This invention was made with government support under ECS9212407 awarded by National Science Foundation. The government has certain rights in the invention.--

Signed and Sealed this
Seventh Day of April, 2015

Michelle K. Lee
*Director of the United States Patent and Trademark Office*